Figure 1:
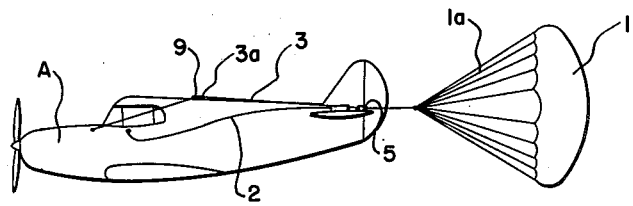

March 17, 1953 P. F. SMITH 2,631,797
PARACHUTE DEPLOYING MEANS

Filed Aug. 25, 1947 3 Sheets-Sheet 1

INVENTOR.
PREVOST F. SMITH
BY
*Wm. H. Dean*
AGENT

March 17, 1953　　　　P. F. SMITH　　　　2,631,797
PARACHUTE DEPLOYING MEANS

Filed Aug. 25, 1947　　　　　　　　　　　　3 Sheets-Sheet 2

INVENTOR.
PREVOST F. SMITH
BY
Wm. H. Dean
AGENT

March 17, 1953     P. F. SMITH     2,631,797
PARACHUTE DEPLOYING MEANS
Filed Aug. 25, 1947     3 Sheets-Sheet 3
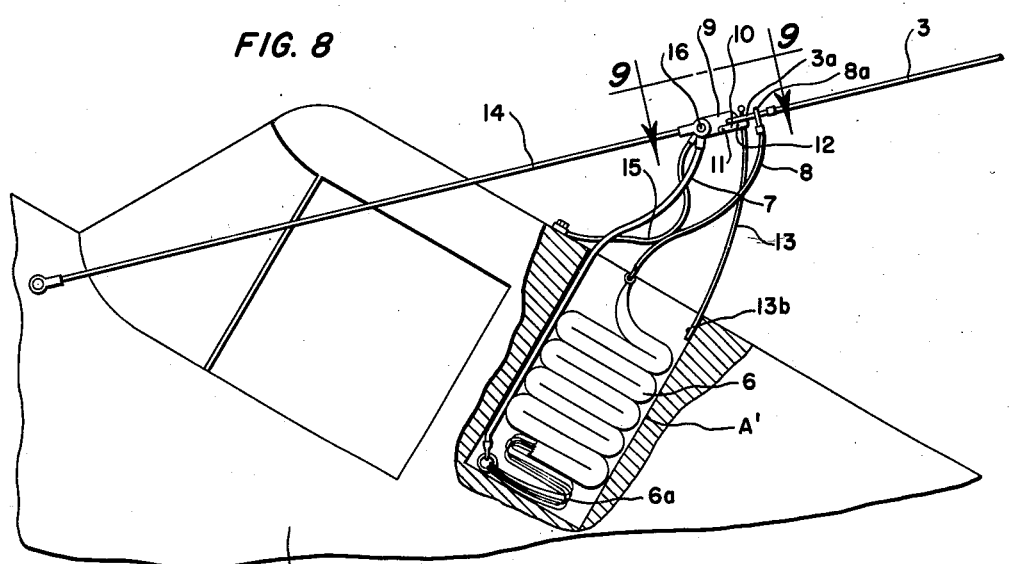
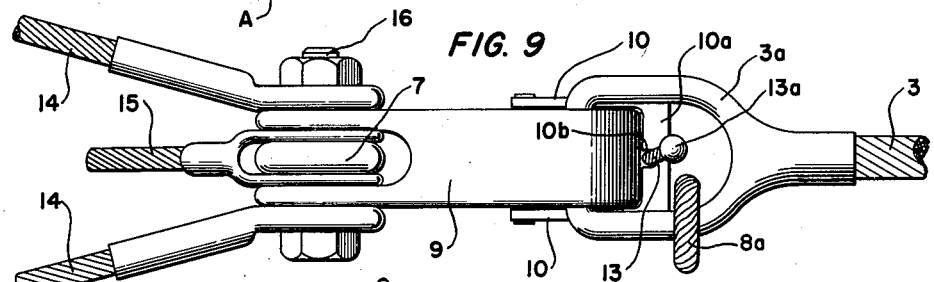
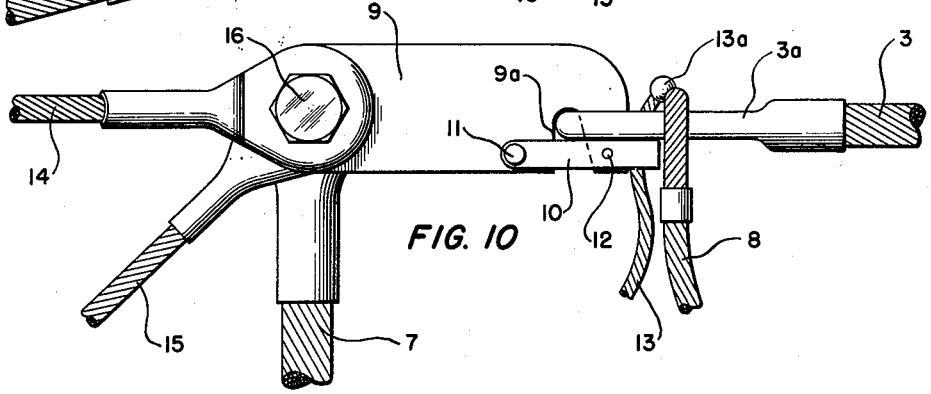
INVENTOR.
PREVOST F. SMITH
BY
Wm. H. Dean
AGENT Patented Mar. 17, 1953

2,631,797

UNITED STATES PATENT OFFICE 2,631,797

PARACHUTE DEPLOYING MEANS

Prevost F. Smith, San Diego, Calif.

Application August 25, 1947, Serial No. 770,509

8 Claims. (Cl. 244—139)

My invention relates to a parachute deploying means more particularly for use in the control and suspended descent of a disabled aircraft. The objects of my invention are:

First, to provide a parachute deploying means of this class which is particularly adapted for use in progressively deploying a pilot parachute and main parachute so that the aircraft in connection therewith progressively slowed down whereby undue shock loads are not apparent in the deployment of the main parachute capable of slowly lowering the disabled aircraft to the ground.

Second, to provide a parachute deploying means of this class in which the pilot parachute is deployed rearwardly of the tail assembly of an aircraft and maintains in such position until it has properly slowed the airplane to a safe speed for the opening of the main parachute.

Third, to provide a parachute deploying means of this class having a novel pilot parachute cable anchoring means near the tail of the airplane equipped, which effectively prevents the pilot parachute from deploying the main parachute until the aircraft is sufficiently decelerated by the action of said pilot parachute.

Fourth, to provide a parachute deploying means of this class which effectively returns an airplane into straight flight after it has gone into a spin, or assumes an undesirable attitude in flight.

Fifth, to provide a parachute deploying means of this class in which the pilot parachute is packed on the tail of the airplane and opens rearwardly thereof which prevents hazard to the tail surfaces of the airplane.

Sixth, to provide a parachute deploying means of this class which creates a minimum amount of turbulence about the airfoil surfaces of the airplane when the parachutes are deployed.

Seventh, to provide a parachute deploying means of this class in which the cables connected to the pilot parachute are initially and temporarily anchored slightly forward of the tail of the airplane preventing damage to the passenger compartment thereof in case the parachutes are deployed during a spin or other similar dangerous conditions.

Eighth, to provide a parachute deploying means of this class in which the pilot parachute deploys the main parachute cables in a vertical plane, from a position rearwardly of the tail surfaces of the airplane whereby hazard to the airfoil surfaces of the airplane and the passenger compartment is reduced to a minimum.

Ninth, to provide a parachute deploying means of this class which does not become tangled with various accessories of the airplane such as radio aerial or the like because the airplane is forced into an angular attitude whereupon the main parachute passes almost at right angles to the axis of the airplane when being deployed therefrom by the pilot parachute.

Tenth, to provide a parachute deploying means of this class which may be used very effectively in the prevention of an aircraft from overshooting runways when landing or taking off.

Eleventh, to provide a parachute deploying means of this class which is very simple and economical of construction, efficient in operation and which will not readily deteriorate or get out of order.

Figure 2:
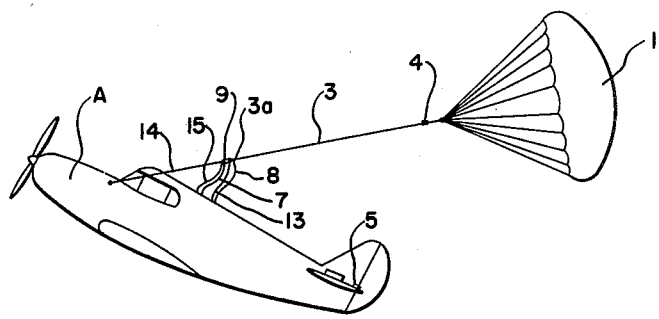
Figure 3:
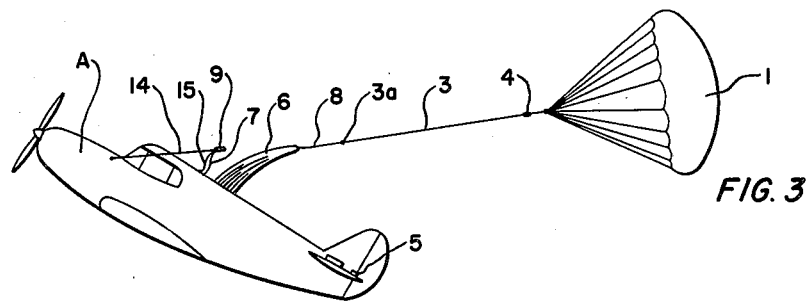
Figure 4:
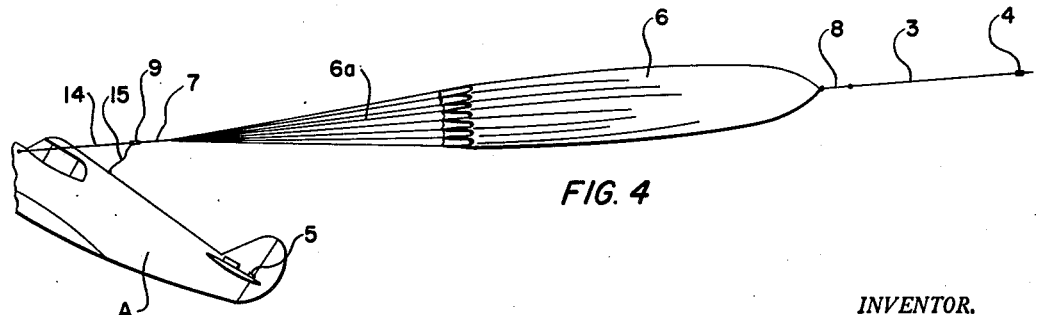
Figure 5:
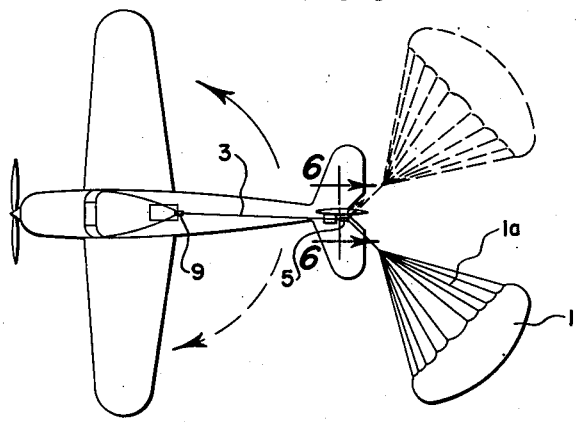
Figures 6, 7:
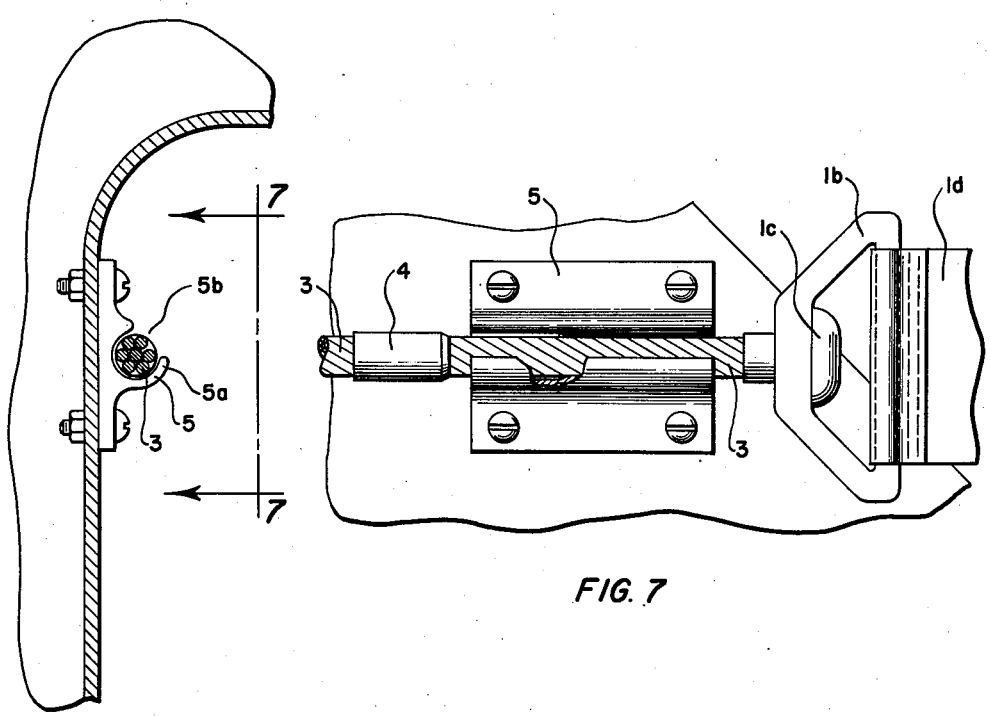

With these and other objects in view, as will appear hereinafter, my invention consists of certain novel features of construction, combination and arrangement of parts and portions as will be hereinafter described in detail and particularly set forth in the appended claims, reference being had to the accompanying drawings, and to the characters of reference thereon forming a part of this application in which: Figure 1 is a side elevational view of an airplane showing my parachute deploying means in connection therewith and showing the pilot parachute thereof in deployed position; Figure 2 is a side elevational view of an airplane showing my parachute deploying means in connection therewith and showing the pilot parachute restraining the airplane and forcing the same into a stall attitude; Figure 3 is a side elevational view of an airplane showing my parachute deploying means in connection therewith and performing a progressive operation following that as shown in Fig. 2 of the drawings wherein the main parachute is being extracted from the airplane by the pilot parachute; Fig. 4 is a similar view to Fig. 3 showing the main parachute deployed and beginning to open; Fig. 5 is the top or plan view of an airplane showing my parachute deploying means in connection therewith and illustrating by arrows and dash lines various attitudes created by the pilot parachute when in open position whereby a spin of the airplane is positively resisted; Fig. 6 is an enlarged fragmentary sectional view taken from line 6—6 of Fig. 5; Fig. 7 is a fragmentary side elevation of a view taken from line 7—7 of Fig. 6 showing portions broken away and in section to amplify the illustration; Fig. 8 is an enlarged side elevational view of the aircraft showing a portion of my parachute deploying means in connection therewith in similar position to the attitude as shown in Fig. 2 of the drawings; Fig. 9 is an enlarged fragmentary plan view taken from the line 9—9 of Fig. 8; and Fig. 10 is a side elevational view of the structure as shown in Figure 9.

Similar characters of reference refer to similar parts and portions throughout the several views of the drawing.

The pilot parachute 1, pilot parachute ripcord 2, pilot parachute cable 3, cable sleeve 4, cable anchor 5, main parachute 6, main parachute cables 7 and 8, cable release hook 9, latch bars 10 and 11, shear pin 12, latch operating cable 13, aircraft supporting cables 14 and 15, and the bolt 17 constitute the principle parts and portions of my parachute deploying means.

The pilot parachute 1, as shown in Figure 1 of the drawing, is packed in the conventional manner at a location adjacent the rudder and horizontal stabilizer at the tail surfaces of the airplane A, as shown in Figs. 1, 2 and 3 of the drawings. The ripcord extends from the pilot parachute pack at the tail to the operator's compartment of the airplane A, and is for the purpose for initiating operation of my parachute deploying means. In connection with the shroud lines 1a of the pilot parachute 1, is a webbing strap 1d on the bridle 1b, having a swivel 1c connected to the pilot parachute cable 3. This pilot parachute cable 3 is provided with a sleeve 4 fixed thereon. This sleeve 4 is slightly larger in diameter than the cable 3, and is adapted to engage the socket portion 5a in the cable anchor 5 which is secured to the tail of the airplane intermediate the pilot parachute and rip sleeve 4. As shown in Fig. 6 of the drawing, the cable anchor 5 is provided with an open side portion 5b, through which the cable 3 is readily, laterally movable. The fitted relationship of the sleeve 4 in the socket portion 5a of the cable anchor 5, effectively prevents lateral movement of the cable 3 outwardly of said open side 5b of the cable anchor 5 because the socket portion 5a extends substantially more than 180°, about the periphery of the sleeve 4. Engagement of the sleeve 4 in the socket 5a is only occasioned by tension placed in the cable 3 which substantially elongates the same when the pilot parachute 1 is opened. The cable 3 extends forwardly to a position adjacent the passenger compartment of the airplane A, and is provided with a swaged eye terminal 3a on its forward end, as shown best in Figs. 8, 9 and 10 of the drawings. This loop-shaped fitting 3a is normally engaged in the angular notch portion 9a of the cable release hook 9, and the latch bars 10 pivotally mounted to the cable release hook 9 by means of the pin 11, are arranged to enclose the open end of said notch portion 9a, and these latch bars 10 are maintained in such position by the shear pin 12. As shown in Fig. 9 of the drawings the latch bars 10 are interconnected at their extending ends by an integral yoke 10a having a notch 10b therein through which the latch operating cable 13 extends. The normally upper end 13a of this cable 13 is enlarged so that it abuts the portion 10a of the latch bars 10 when tension is created in said cable 13. It will be noted that the cable release hook 9 is provided with a downwardly and rearwardly angular portion at its rear side arranged to facilitate movement of the hook portion 3a in connection with the pilot parachute cable 3 when the latch bars 10 are pivotally moved out of position after the pin 12 has been sheared. The cable release hook 9 is pivotally secured with the cables 14, 15 and 7 by means of the bolt 16. The cables 14 and 15 are secured to structure of the airplane substantially forward and above the center of gravity thereof, and the cable 7 is connected to the shroud lines 6a of the main parachute 6 stowed in the compartment A' open at the upper side of the airplane A as shown best in Figure 8 of the drawing. The middle of the main parachute 6 is connected to the cord 8 provided with a loop portion 8a at its upper end fitted through the loop-shaped fitting 3a of the pilot parachute cable 3. As shown in Fig. 8 of the drawings, the latch operating cable 13 at its lower end, 13b is rigidly secured to structure of the airplane A.

The operation of my parachute deploying means is substantially as follows:

When the pilot of the airplane A senses a dangerous condition of the airplane, such as, an uncontrollable situation involving a spinning condition, or any other dangerous condition, the pilot pulls the ripcord 2, passing through a fair lead into the operator's compartment of the airplane A. The ripcord 2 extends rearwardly in connection with the pack of the pilot parachute located on the tail, when he opens said pack, and permits the pilot parachute 1 to open rearwardly of the tail of the airplane A as shown in Fig. 1 of the drawing. At high speed of the airplane the immediate rearward shock load causes considerable tension in the pilot parachute cable 3, which substantially elongates said cable 3 and causes the sleeve 4 to pass into the socket 5a of the cable anchor 5. This prevents lateral releasing of the cable 3 outwardly of the open side 5b of the cable anchor 5 until the airplane has slowed down to a predetermined speed, creating a drag load on the pilot parachute substantially less than that required to deflect the cable 3, wherein the sleeve 4 engages said socket 5a in the cable anchor 5. When this load decreases natural resilience in the cable 3 forces the sleeve 4 out of the socket 5a permitting the cable 3 to angularly release from the cable anchor 5 laterally thereof through the open side 5b thereof. It will be here noted that the natural tendency of the cable 3 to raise relatively to the tail is caused by the disposition of the forces exerted by the pilot parachute on an axis substantially above the center of gravity of the airplane A. Thus the cable anchor 5 effectively prevents the pilot parachute from angling the airplane A and deploying the main parachute before the airplane has sufficiently decelerated. At high speed it would be impossible to deploy the main parachute because the shock load would be so forceful as would destroy the structure of the airplane and possibly injure the pilot. Thus, the pilot parachute effectively slows down the airplane until the drag in connection with the cable 3 is decreased, permitting the sleeve 4 to move out of the socket 5 and allowing the cable 3 to raise above the tail of the airplane as indicated in Fig. 2 of the drawings. When the angle of the cable 3 increases relatively to the axis of the airplane A to a certain degree, the latch operating cable 13 is placed in tension, exerting a shear load on the pin 12 passing through the latch bars 10 and the cable release hook 9. As soon as this pin is sheared, latch bars 10 are pulled out of interfering relation with the loop-shaped portion 3a in connection with pilot parachute cable 3, which readily slides out of the angular notch portion 9a of said cable release hook 9. When this happens the pilot parachute 1 creates tension in the cable 8 connected to the loop shape portion 3a of the cable 3, which cable 3 pulls the middle main portion of the main parachute out of the compartment A' of the airplane, thereby deploying the main parachute progressively as shown in Figs. 3 and 4 progressively as shown in Figs. 3 and 4 respectively. Then the cable 7 is placed in tension, which is equal in strength to the support of the airplane A, and this cable 7 in connection with the cables 14 and 15, effectively suspends the airplane A from the main parachute 6 for safely and slowly lowering the same to the ground. It will be here noted that the deployment of the main parachute 6 by the pilot parachute 1, is accomplished very neatly due to the fact that the pilot parachute 1 forces the airplane A into an inclined attitude whereby the pilot parachute pulls the main parachute directly out of the top of the airplane at an angle adapted to clear the tail of said airplane A, which effectively prevents entanglement of the main parachute during the deployment thereof.

In a slow speed deployment operation, wherein the airplane has assumed a slow spin attitude close to the ground it is desirable to deploy the main parachute very rapidly. In such condition the low speed of the airplane does not create sufficient drag on the pilot parachute when deployed to elongate the cable 3 sufficiently to place the sleeve 4 in the socket 5a of the cable anchor 5. Thus, the pilot parachute is almost instantly freed from the cable anchor 5 and readily goes into action to deploy the main parachute. This automatic operation takes place at low speeds where it is necessary to slow the airplane down quickly as at low altitudes. Fig. 5 of the drawings illustrates the reaction of the pilot parachute in a spin, so that the spinning condition of the airplane is readily rectified as the pilot parachute opens preliminary to the deployment of the main parachute thereby. A further operation of my parachute deploying means is advantageous in the stopping or slowing down of an airplane which is overshooting the runway of the landing field, either in landing or taking off. Thus, accidents on the ground, as well as in the air, may be averted by use of my parachute deploying means.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a parachute deploying means of the class described, the combination of an airplane, a pilot parachute, a cable connected therewith, a cable anchor engaging said cable and secured to said airplane adjacent to the tail surfaces thereof, a fixed sleeve on said cable, slightly larger in diameter than said cable, said cable anchor having a socket therein having an opening to receive said sleeve and provided with a reduced opening in the side thereof through which the diameter of said cable may pass, a second cable connected with said airplane forwardly of and above the center of gravity thereof, a latch fixed to said second cable, said first mentioned cable connected with said latch and adapted to be released therefrom when pivoted to a certain angle with respect to the axis of said airplane and a main parachute cable connected to said first mentioned cable.

2. In a parachute deploying means of the class described, the combination of an airplane, a pilot parachute, a cable connected therewith, a cable anchor engaging said cable and secured to said airplane adjacent to the tail surfaces thereof, a fixed sleeve on said cable, slightly larger in diameter than said cable, a stationary socket having an opening to receive said sleeve and provided with a reduced opening in the side thereof through which the diameter of said cable may pass, a second cable connected with said airplane forwardly of and above the center of gravity thereof, a latch fixed to said second cable, said first mentioned cable connected with said latch and adapted to be released therefrom when pivoted to a certain angle with respect to the axis of said airplane and a main parachute cable connected to said first mentioned cable, a second main parachute cable, connected to the shroud lines of said main parachute, and to said second mentioned cable.

3. In a parachute deploying means of the class described, the combination of an airplane, a pilot parachute, a stretchable cable in connection therewith, a cable anchor adapted to be stationarily secured to the airplane adjacent to the tail surfaces thereof, said cable having means engageable with said cable anchor, whereby, extreme drag in connection with said pilot parachute stretches and deflects said cable longitudinally and thereby automatically engages said cable firmly with said anchor preventing lateral displacement of said cable from said anchor and automatically permitting lateral displacement of said cable from said anchor when the load on said parachute decreases and said cable shortens, said cable extending forwardly from the tail surfaces of said airplane, a main parachute having its middle portion connected to said cable, cable releasing hook in connection with said airplane above the center of gravity thereof adapted to hold said first mentioned cable and release the same when the drag of said pilot parachute changes the angular attitude of said airplane, the said cable in connection with shroud lines of said main parachute connected to said airplane.

4. In a parachute deploying means of the class described, the combination of an airplane, a pilot parachute, a stretchable cable having an enlarged portion in connection therewith, a cable anchor means stationarily secured to said airplane near the tail surfaces of the airplane and engaged by said enlarged portion of said cable, latch means on the forward end of said cable, a main parachute having shroud lines and connected at the middle portion to said cable, a second cable in connection with the shroud lines of said main parachute connected to said airplane, whereby, initial drag of said pilot parachute stretches and deflects said cable longitudinally and thereby automatically engages said cable firmly, anchor means with said first mentioned cable, preventing lateral displacement thereof, from the tail surfaces of said airplane and automatically permitting said cable to be released when said airplane is slowed down and the drag in connection with said pilot parachute is reduced to a predetermined amount and said cable shortens.

5. In a parachute deploying means of the class described, the combination of an airplane, a pilot parachute, adapted to be released manually behind the tail surfaces of an airplane, a cable in connection with said pilot parachute, a sleeve fixed on said cable, means in connection with said cable for anchoring the same, in connection with the rear end of said airplane, including an anchor having a stationary socket adapted to automatically receive said sleeve, when said cable is elongated by drag on said parachute.

6. In a parachute deploying means of the class described, the combination of an airplane, a pilot parachute, a cable in connection therewith, release means in connection with the opposite end of said cable, said release means connected to said airplane, a main parachute having the middle portion thereof connected to said first mentioned cable, shroud lines in connection with the main parachute connected to said airplane and a release cable interconnecting said release means and said airplane, whereby, angular disposition of said first mentioned cable relatively to the axis of said airplane releases said first cable from said second mentioned cables, permitting said pilot parachute to pull the middle portion of said main parachute clear of said airplane.

7. In a parachute deploying means of the class described, the combination of an airplane, a pilot parachute, a cable in connection therewith, release means in connection with the opposite end of said cable, said release means connected to said airplane, a main parachute having its middle portion connected to said first mentioned cable, shroud lines in connection with the main parachute connected to said airplane and a release cable interconnecting said release means and said airplane, whereby angular disposition of said first mentioned cable relatively to the axis of said airplane releases said first cable from said second mentioned cables permitting said pilot parachute to pull out the middle portion of said main parachute clear of said airplane, said release means including hook-shaped member latch bars enclosing the open portion thereof, having shear pins extending therethrough connected with said release cable, whereby said shear pins permit the pivotal movement of said latch bars for releasing said first mentioned cable from said second mentioned cable.

8. In a parachute deploying means of the class described, the combination of an airplane, a pilot parachute, a slightly stretchable cable connected at one end to said parachute, a cable anchor stationarily secured to said airplane adjacent the tail surfaces thereof, said cable having a sleeve secured thereto, said sleeve being engaged by said anchor when said cable is tensioned longitudinally upon extreme drag load on said pilot parachute, said sleeve preventing lateral displacement of said cable relative to said anchor when said cable is tensioned and permitting said cable to be laterally displaced relative to said anchor when the drag load is decreased and said cable not under tension.

PREVOST F. SMITH.

REFERENCES CITED

The following references are of record in the file of this patent:

UNITED STATES PATENTS

| Number | Name | Date |
|---|---|---|
| 1,900,399 | Lakehurst | Mar. 7, 1933 |
| 2,050,324 | Hoffman | Aug. 11, 1936 |
| 2,392,448 | Atherton | Jan. 8, 1946 |